July 24, 1962  C. M. BROWNE  3,046,433
GLASS FRIT MATERIAL
Filed Sept. 24, 1956

INVENTOR.
Charles M. Browne
BY
Nobbe & Swope
ATTORNEYS

United States Patent Office 3,046,433
Patented July 24, 1962

3,046,433
GLASS FRIT MATERIAL
Charles M. Browne, Toledo, Ohio, assignor to Libbey-Owens-Ford Glass Company, Toledo, Ohio, a corporation of Ohio
Filed Sept. 24, 1956, Ser. No. 611,486
15 Claims. (Cl. 313—108)

The present invention relates broadly to electrically conducting glass of the type made up of a sheet of glass having a transparent electrically conducting film on a surface thereof. More particularly, this invention relates to the provision of a low melting glass frit in contact with electrically conducting films of this type.

Now transparent, electrically conducting films are well known, and such films have been used for various devices such as de-icing windshields and electroluminescent panels. In such structures, it is important that the various components of the structure be permanently attached to avoid breakdown, particularly when the unit is subjected to extreme thermal changes.

Also, it is customary in such structures to provide a bus bar or electrode in contact with the electrically conducting film, and such bus bars are generally composed of a large amount of powdered metallic material such as silver, and a glass frit material which is fired onto the glass or ceramic surface. When glass frit is fired onto glass, it provides excellent adherence, and the above electrodes have proven to be mechanically satisfactory. However, when the electrically conducting film is formed in contact with and overlying the fired-on frit material, a high resistance interface generally exists between the film and frit material.

It has now been found that this characteristically undesirable effect of ordinary glass frit materials on electrically conducting tin oxide films may be substantially eliminated by using a special glass frit composition in combination therewith. When such a frit is used in making fired-on silver-flux electrodes, the problem of arcing at the juncture or meeting line of the electrically conducting film and the electrodes, or the electrode film interface has been substantially eliminated.

In accordance with this invention, glass frit materials may be fired-on in a position which is in contact with electrically conducting films in other and different structures wherein it is also important to prevent an undue increase in the resistance of the electrically conducting film.

A typical structure in which such an arrangement is valuable is an electroluminescent panel, in which an electrically conducting tin oxide film is formed on a sheet of glass and a glass frit material with phosphor particles incorporated therein is fused to the conductive surface of the electrically conducting film. The electrically conducting film and the glass plate are transparent, which allows the light formed by the phosphor to be transmitted therethrough. A second conducting plate is placed adjacent the exposed face of the phosphor containing frit which may or may not be transparent so that an electric field may be provided to excite the phosphor material. In such a structure, when the glass frit containing the phosphor particles is fused to the conducting surface of the conducting plate, which may be a sheet of glass coated with electrically conducting tin oxide, the glass frit is formed adjacent to the electrically conducting film of tin oxide, and it is important in such a structure to prevent destruction or serious impairment of the electrical properties of the tin oxide film.

Another structure in which glass frit material may be fired adjacent to an electrically conducting film, is a unit in which the frit serves as an insulating material over the film. In such a unit, it is also important to provide a frit material which does not unduly affect the surface resistivity of the film. In addition, it is an advantage to provide an insulating material which is transparent.

It is also believed that there are other useful structures in which glass frit may be formed in contact with the electrically conducting tin oxide films. In fact, the glass frit of this invention may be used to advantage in any structure where a frit is in contact with a conducting coating and in which it is important to prevent deterioration of the conducting property of the film.

It is a primary object of this invention to provide a glass frit material which may be fired adjacent to electrically conducting tin oxide films without seriously affecting the conductivity of the film.

Another object of this invention is to provide articles in which a special low melting glass frit material is fired-on and positioned adjacent to an electrically conducting film, and to provide a method of constructing such articles.

Still another object of this invention is to provide a method of making an electrically conducting glass unit of the general character above described having a relatively strong and low resistance interface between the metal electrode and the electrically conducting film.

A further object of this invention is to provide an electrically conducting glass unit in which a transparent glass insulating film is provided as a protective coating over the electrically conducting film.

A still further object is to provide electroluminescent panels and a method for making the same, in which a phosphor material is held in a transparent glass film in adjacent position to a transparent electrically conducting film or plate.

Other objects and advantages of the invention will become more apparent during the course of the following description when taken in connection with the accompanying drawings.

In the drawings, wherein like numerals are employed to designate like parts throughout the same:

Figure 1:
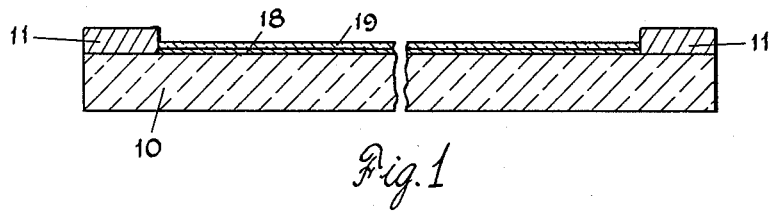
FIG. 1 is a cross-sectional view of an electrically conducting glass unit constructed in accordance with this invention, in which a protective layer is provided over the electrically conducting film.
Figure 2:
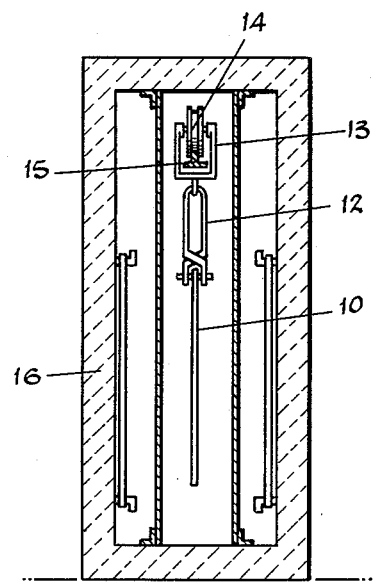
FIG. 2 is a vertical sectional view through a heating furnace which may be used to fire a frit onto the glass sheet and/or to heat the sheet prior to filming.

In producing the frit material of this invention, I have found that if strong alkalis like sodium are avoided or held to a minimum in the glass frit composition used, that interface problems and deleterious effects on the electrically conducting tin oxide film are substantially eliminated. However, another essential property of the glass frit materials is that they be low melting so that they may be fired-on without using temperatures which would destroy the glass or ceramic material on which they are being fired, or when being fired directly over a tin oxide film without using a temperature which would destroy the film.

However, low melting glass frit materials have been produced by incorporating large amounts of sodium therein or other strong alkali materials. Now, to merely eliminate these alkali materials from standard frit compositions is not satisfactory, because the resulting composition would not have the required low melting point and would not meet the requirements of this invention. In order to reduce the amount of alkali materials without objectionable raising of the melting point, I have provided an additional material that renders the frit composition sufficiently low melting. I prefer to use boric oxide as this material but it is to be understood that other materials may be used.

A number of low melting glass frit compositions were made up which were low in alkali materials and compared with glass frit materials conventionally used for making electrodes for electrically conducting tin oxide films. Certain of these materials are given below in Table I in which the low alkali materials are designated I to IV, and the conventional frits are labeled A and B.

Table I

| Composition | I | II | III | IV | A | B |
|---|---|---|---|---|---|---|
| $B_2O_3$ | 89 | 36.19 | 43.8 | 66 | 33.3 | 35 |
| $SiO_2$ | 0 | 19.37 | 19.0 | 20 | 33.3 | 35 |
| $Na_2O$ | 0 | 1.94 | 0 | 5 | 28.6 | 30 |
| $Li_2O$ | 7.3 | 0 | 5.6 | 2 | 0 | 0 |
| $CaF_2$ | 0 | 0 | 4.3 | 0 | 0 | 0 |
| $ZnO$ | 0 | 32.77 | 22.8 | 0 | 0 | 0 |
| $CaO$ | 0 | 4.01 | 2.2 | 0 | 0 | 0 |
| $Al_2O_3$ | 3.7 | 3.3 | 2.3 | 3 | 0 | 0 |
| $S_2O$ | 0 | 0 | 0 | 0 | 0 | 0 |
| $BaO$ | 0 | 0 | 0 | 0 | 4.8 | 0 |
| $SnO_2$ | 0 | 0 | 0 | 0 | 0 | 0 |
| $V_2O_5$ | 0 | 0 | 0 | 0 | 0 | 0 |
| $P_2O_5$ | 0 | 0 | 0 | 2 | 0 | 0 |
| $MgO$ | 0 | 0 | 0 | 2 | 0 | 0 |
| $K_2O$ | 0 | 0 | 0 | 0 | 0 | 0 |
| $TiO_2$ | 0 | 2.17 | 0 | 0 | 0 | 0 |

The effect of firing the above-mentioned glass frit compositions in a position adjacent to the electrically conducting tin oxide film was determined by the following procedure: The initial resistance over a 2½ inch square electrically conducting panel was measured after applying an air-dry silver bridge or overlay across the juncture or meeting line of the fired-on electrode and the contacting electrically conducting tin oxide film to positively remove interface resistance. The air-dry silver bridge was then removed with a solvent, and a butyral acetate suspension of the powdered glass frit material was sprayed on the electrically conducting surface to a thickness of several thousandths of an inch. The powdered glass frit material was then removed at the interface of the electrode and electrically conducting film to a width of 1/16 inch from the electrode. The sample was then fused in a pit-type furnace maintained at 1250° F. for three minutes, and the samples were cooled. An air-dry silver bridge was applied to remove the interface resistance in the same manner as was done in measuring the resistance of the initial sample, and the resistance of the treated panel was then measured. The firing time, the firing temperature and the amount of frit applied was the same for each of the materials evaluated. It is thus seen that the increase in resistance of the initial 2½ inch square panels indicates the effect of the glass frit material on the conductivity of the tin oxide film. These results are given in tabular form in Table II below:

Table II

[Resistance—ohms]

| Composition | Original | After treatment |
|---|---|---|
| I | 530 | 590 |
|   | 300 | 400 |
|   | 210 | 520 |
| II | 300 | 500 |
|   | 280 | 1,250 |
| III | 520 | 580 |
|   | 350 | 1,200 |
| IV | 410 | 1,100 |
|   | 440 | 13,000 |
| A | 410 | 3,700 |
|   | 240 | 1.5 meg. |
| B | 300 | 5,800 |

From the tables above, it is graphically evident that the adverse effect of the glass frit material on the electrically conducting tin oxide film is higher with glasses containing the larger quantities of alkaline materials and less for those containing the least quantity of alkaline material.

It is believed that the alkaline materials in the glass frit fluxes with the electrically conducting tin oxide material thereby reducing or destroying the electrical conductivity of the tin oxide film. The oxide of the alkali metals such as sodium oxide appear to be the worst offenders, and oxides of alkaline earth metals such as calcium oxide also have an adverse effect. Accordingly, these materials should be kept to a minimum as ingredients in the glass frit. Since certain amounts of alkali oxides are desired, small amounts of oxides of alkali metals may be added. However, in the preferred composition, alkaline earth oxides are substantially eliminated. As may be seen in Table I, a composition which contains 7.3% lithium oxide does not have too serious an effect on the electrical properties of the film and small amounts of these materials may be used. However, the total percent of alkali and alkaline earth oxides should be less than about 10%. In addition to boric oxide, it is also possible to add materials such as lead oxide to the glass to render it low melting. Such materials should be avoided if the frit is to be used with an electroluminescent phosphor because of the poisoning effect of the lead, but may be used to advantage when the frit is used as an electrode or as an insulating layer.

As has been stated, the above mentioned glass frit may be used as the flux material to form fired-on metal-flux electrodes. A typical silver-flux that may be used is made of 65.6% silver, 7.8% frit, 18% organic binder, and 8.54% thinner. After firing, the final electrode material may contain approximately 10% frit and 90% silver which provides both the required electrical conductivity and mechanical adherence on the glass surface.

Referring now more particularly to the drawings, there is shown in FIG. 1 a sheet of glass 10 to be rendered electrically conducting. The sheet is provided with electrodes 11 which are composed of the above described metal-flux.

Figure 3:
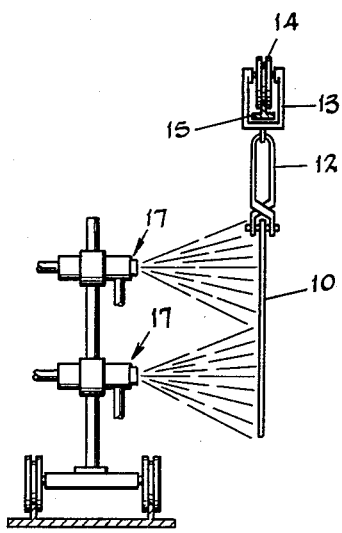
FIG. 3 is an end view of a spraying apparatus for applying filming material to a heated sheet.

With the electrodes in place, the sheet 10 is hung from tongs 12 suspended from a carriage 13 provided with wheels 14 running on a monorail 15. In this way, the sheet is passed into and through a tunnel-type furnace 16 within which it is heated to substantially its point of softening to simultaneously prepare the sheet for filming and to fire-on the electrode. After the sheet 10 has reached the required temperature, it is removed from the furnace and brought into filming position as shown in FIG. 3 where it is uniformly sprayed over its entire surface with a filming liquid from the spray guns 17.

The filming liquid may be a solution of tin halides such as any of the tin compounds known to produce a film of the desired characteristics. For example, stannic tetrachloride will react with the hot glass to leave a thin, transparent, tightly adherent, electrically conducting film or coating 18 of tin oxide on the glass; and, as can be seen in FIG. 1, the film covers the entire surface of the glass between the electrodes 11 and is in electrical contact with the electrodes. The electrically conducting film 18 may be applied by any of the well known procedures for applying such a film and it is to be understood that this invention is not limited to tin oxide films prepared from solutions of tin halides as set forth in the illustration.

It is also contemplated that when using the glass frit material of this invention, the film 18 may be provided on the glass sheet 10 and the electrode fired over the electrically conducting film. Due to the comparatively low melting point of the glass frit of this invention and the fact that it does not seriously impair the electrical properties of the electrically conducting film, such an arrangement is practical and again the usual high interfacial resistance is avoided. Although such a procedure entails an additional heating step beyond that shown in the illustrated procedure, it may be useful where the glass sheet is to be bent or tempered or otherwise subjected to an additional heat treatment.

In FIG. 1, there is shown an electroluminescent structure in which the electrically conducting film 18 is protected by a transparent insulating layer 19. While FIG. 1 has been used to illustrate how this invention may be used in the electrode, it is contemplated that the protective layer 19 may be absent in such structures.

In addition, when the protective layer 19 is applied, it is contemplated that the electrodes 11 may be composed of sprayed copper, sprayed copper alloys or other metals may be used in place of the above described metal-flux electrode, or that other metal-flux electrodes may be used along with other methods of correcting the interface resistance such as an air-dry silver bridge or overlay over the joints between the film and the electrode.

The protective layer or film 19 may be formed by brushing or spraying or otherwise coating the electrically conducting film 18 that has been applied to a sheet of glass 10 as hereinbefore described. The film or coating 19 consists of a glass frit material of the type hereinbefore described which is ground up and combined with organic binder and thinner. The unit is then again subjected to sufficient heat to fire on the glass frit material and form the protective coating 19.

The fused glass coating or film 19 may be applied without causing objectionable change in the resistance of the electrically conducting film. When the insulating effect is tested by dipping the coated unit into salt water up to where the connections were made and 110 volts applied, there is no evidence of short circuiting. In other words, the fused coating provides full protection against electric shock and also completely protects the electrically conducting film from moisture which would otherwise cause short circuits. In addition, the fused glass coating is heat resistant and protects against scratches and other injuries which will ruin an electrically conducting film.

A glass coated unit is particularly useful when used as a heat source, and in particular as a radiant heat source. In general, tin oxide films are poor radiators because they have a comparatively low coefficient of emissivity, whereas glass is a good radiator having a high coefficient of emissivity. Accordingly, more heat is radiated from the glass surface than would have been radiated from the electrically conducting surface at the same temperature.

In order to make electroluminescent panels embodying the method of this invention, any of the above compositions I through IV or other low alkali, low melting glass frit compositions are mixed with electroluminescent phosphor particles and applied to the conducting surface of an electrically conducting glass panel. The phosphor containing frit material is then fired-on to the electrically conducting surface by a procedure similar to that given heretofore for testing the effect of the frit materials or in providing the protective coating 19.

The phosphor may be any material which will emit light under the influence of an electric field. An example of such a material is the composition made by firing a powdered mixture of 75% zinc sulfide and 25% zinc oxide by weight, with small amounts of an activator such as copper halide, the firing being done between 900° C. and 1250° C. in an atmosphere of inert gas.

Figure 4:
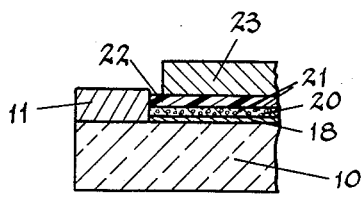
FIG. 4 is a fragmentary cross-sectional view illustrating an electroluminescent structure which may be made in accordance with this invention.

In FIG. 4, there is shown a sheet of glass 10 having an electrode 11 and an electrically conducting film 18 which is similar to the structure of FIG. 1 except that only one electrode is provided on the glass sheet 10. A phosphor containing frit material is fired over the electrically conducting film 18 to form a glass coating 20 having phosphor particles 21 imbedded therein. After firing, a dielectric layer 22 may be applied, if desired, and preferably the dielectric is a thin sheet of plastic material such as nitrocellulose or polyvinyl butyral. A second electrically conducting plate 23 is then assembled in contact with the dielectric plastic layer 22 to provide the unit in which the field-responsive phosphor is permanently positioned between the electrically conducting film 18 and the plate 23 which acts as a condenser when the desired alternating voltage is established therebetween. The plate 23 may be a metal plate or it may be a second electrically conducting glass sheet. The entire unit may be laminated together by means of the dielectric interlayer 22, or the dielectric layer 22 may be omitted and the unit may be fused together by the use of an additional glass frit layer being applied to the surface of the plate 23 and the entire unit fired to form a single structure. When both plates are transparent electrically conducting sheets, the resulting unit has the advantage of being substantially transparent and may be used as a window as well as a source of light. When the plate 23 is a metal, greater structural strength may be provided and the light is emitted through the transparent electrically conducting film 18 and the glass sheet 10.

It is seen that in such a construction where it is necessary to fire a glass frit material in contact with an electrically conducting tin oxide film, it is important that the conductivity of the tin oxide film be preserved during the firing so that the resulting film may be transparent and of sufficient electrical conductivity.

Accordingly, it has been found that a number of situations exist in which it is desirable to form a glass frit material in contacting position to an electrically conducting tin oxide film, and that such a frit may contain other materials such as powdered silver and electroluminescent phosphors. For these reasons, the invention is not limited to any of these specific applications, but it is contemplated that other materials may be used in combination with the glass frit and that other structures may be made in which it is desirable to provide a fired-on glass frit material adjacent to an electrically conducting film.

It is also to be understood that the forms of the invention disclosed herein are to be taken as the preferred embodiments thereof, and that various procedural changes may be resorted to without departing from the spirit of the invention or the scope of the following claims.

I claim:

1. A glass frit material containing less than 20% $SiO_2$ and less than 10% alkali and alkaline earth oxides, having a powdered metal incorporated therein, and having a low firing temperature.

2. A composition as defined in claim 1, in which the metal is silver.

3. An electrically conducting glass unit, comprising a sheet of glass, a transparent electrically conducting film on a surface of the sheet of glass and a glass frit material containing less than 20% $SiO_2$ and less than 10% alkali and alkaline earth oxides fired-on in contacting relation to said electrically conducting film.

4. An electrically conducting glass unit as defined in claim 3, in which the fired-on glass frit material is fired over the electrically conducting film to form a protective insulating layer thereof.

5. An electrically conducting glass unit as defined in claim 3, in which the glass frit is fired over the electrically conducting film and has an electroluminescent field-responsive phosphor incorporated therein, and in which a second transparent electrically conducting layer is formed externally of the phosphor containing frit whereby the phosphor is positioned between the electrically conducting film and the second electrically conducting layer.

6. An electrically conducting unit as defined in claim 3, in which the glass frit has a powdered metal admixed therewith, and is fired-on to provide an electrode which is in electrical contact with the electrically conducting film.

7. An electrically conducting unit as defined in claim 6, in which the powdered metal is silver.

8. In a method of making an electrically conducting filmed structure, the step of firing a low melting glass frit material having less than 20% $SiO_2$ and an alkali and alkaline earth oxide content of less than 10% on a surface, in a contacting position with an electrically conducting tin oxide film.

9. A method of producing an electrically conducting glass unit, which comprises applying electrodes on the surface of the glass sheet, heating the said sheet to approximately its softening point, spraying the heated sheet with a solution of a tin compound to form a tin oxide film in permanent electrical contact with the electrodes, applying a layer of a glass frit material containing less than 20% $SiO_2$ and less than 10% alkali and alkaline earth oxides over the tin oxide film, and heating the unit a sufficient amount to fire on the layer of glass frit material to provide a protective insulating layer over the tin oxide film.

10. A method of producing an electrically conducting glass unit, which comprises applying strips of silver flux along spaced lines on the surface of a glass sheet, said silver flux comprising finely divided silver, a glass frit material containing less than 20% $SiO_2$ and less than 10% alkali and alkaline earth oxides, organic binder and organic thinner, heating the said sheet to approximately its softening point to form fired-on electrodes, and spraying the heated sheet with a solution of a tin compound to form a tin oxide film in permanent electrical contact with the fired-on electrodes.

11. A method of producing an electrically conducting glass unit as defined in claim 10, in which glass frit material containing less than 20% $SiO_2$ and less than 10% alkali and alkaline earth oxides admixed with an organic material is applied over the electrically conducting tin oxide film, and the unit heated to a temperature sufficient to fire on the frit material and form a protective, insulating coating.

12. A method of producing an electrically conducting glass unit, heating a glass sheet to approximately its softening point, spraying the heated sheet with a solution of a tin compound to form a transparent, electrically conducting tin oxide film on a surface of the glass sheet, applying strips of silver flux in liquid form along spaced lines on the surface of a glass sheet over the electrically conducting tin oxide film, said silver flux comprising a finely divided silver, a glass frit material containing less than 20% $SiO_2$ and less than 10% alkali and alkaline earth oxides and having a low firing temperature, organic binder and organic thinner, and heating the said sheet to form fired-on electrodes in electrical contact with the tin oxide film.

13. A method of producing an electrically conducting glass unit, which comprises applying a strip of metal electrode on the surface of a glass sheet, heating the said sheet to approximately its softening point, spraying the heated sheet with a solution of a tin compound to form a transparent, electrically conducting tin oxide film in permanent electrical contact with the electrode, applying a material comprising field-responsive phosphor particles, organic binder, and a glass frit containing less than 20% $SiO_2$ and less than 10% alkali and alkaline earth oxides and having a low firing temperature, heating the unit to fire on the phosphor containing glass frit material, and attaching another sheet of material to said unit, said sheet having electrically conducting surface externally of the phosphor containing glass frit.

14. A method of producing an electrically conducting glass unit as defined in claim 13, in which a layer of said glass frit material is applied over the fired-on phosphor containing glass frit layer, and a metal plate is used for said second sheet of material having an electrically conducting surface, and the unit heated to cause the second layer of glass frit to fire onto both the metal plate and the phosphor containing frit whereby a rigid electroluminescent unit is provided.

15. A method of producing an electrically conducting glass unit, which comprises applying a strip of metal electrode on the surface of a glass sheet, heating the said sheet to approximately its softening point, spraying the heated sheet with a solution of a tin compound to form a tin oxide film in permanent electrical contact with the electrode, preparing a second electrically conducting glass sheet, repeating the above steps to provide a second electrically conducting glass sheet, applying a glass frit material over the electrically conducting tin oxide film of one of the units, said glass frit material containing a field responsive phosphor, organic binder, and a glass frit composed of less than 20% $SiO_2$ and less than 10% alkali and alkaline earth oxides, heating the sheet to fire on the phosphor containing glass frit material, assembling the two electrically conducting glass units with a sheet of dielectric laminating plastic therebetween and the electrically conducting films in face to face relation and the electrodes out of contact with one another, and subjecting the unit to heat and pressure to form a composite unit.

References Cited in the file of this patent
UNITED STATES PATENTS

| | | |
|---|---|---|
| 2,429,420 | McMaster | Oct. 21, 1947 |
| 2,556,616 | Ellis | June 12, 1951 |
| 2,628,927 | Colbert et al. | Feb. 17, 1953 |
| 2,676,117 | Colbert et al. | Apr. 20, 1954 |
| 2,689,190 | Hushley | Sept. 14, 1954 |
| 2,709,765 | Koller | May 31, 1955 |
| 2,730,598 | Lytle | Jan. 10, 1956 |
| 2,774,004 | Jaffe | Dec. 11, 1956 |